United States Patent
Clark et al.

(10) Patent No.: US 10,803,017 B2
(45) Date of Patent: *Oct. 13, 2020

(54) GENERATING FILE USAGE INFORMATION

(71) Applicant: Red Hat, Inc., Raleigh, NC (US)

(72) Inventors: Bryan William Clark, Westford, MA (US); Robert Sanford Havoc Pennington, North Chelmsford, MA (US); Colin Walters, Westford, MA (US); Marina Zhurakhinskaya, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 250 days.

This patent is subject to a terminal disclaimer.

(21) Appl. No.: 15/953,711

(22) Filed: Apr. 16, 2018

(65) Prior Publication Data

US 2018/0232389 A1 Aug. 16, 2018

Related U.S. Application Data

(63) Continuation of application No. 11/948,708, filed on Nov. 30, 2007, now Pat. No. 9,946,722.

(51) Int. Cl.
*G06F 16/00* (2019.01)
*G06F 16/17* (2019.01)
*G06F 7/36* (2006.01)
*G06F 16/10* (2019.01)
*G06F 16/14* (2019.01)

(Continued)

(52) U.S. Cl.
CPC ............ *G06F 16/1734* (2019.01); *G06F 7/36* (2013.01); *G06F 16/10* (2019.01); *G06F 16/14* (2019.01); *G06F 16/168* (2019.01); *G06F 16/182* (2019.01); *G06F 16/54* (2019.01)

(58) Field of Classification Search
CPC .... G06F 16/164; G06F 16/904; G06F 16/252; G06F 16/27; G06F 16/954; G06F 16/9574; G06F 8/71; G06F 3/0643; G06F 16/10; G06F 16/182; G06F 16/188; G06F 16/36;

(Continued)

(56) References Cited

U.S. PATENT DOCUMENTS 5,706,510 A 1/1998 Burgoon
6,081,840 A 6/2000 Zhao (Continued)

FOREIGN PATENT DOCUMENTS

WO 2006/115612 A2 11/2006

*Primary Examiner* — Srirama Channavajjala
(74) *Attorney, Agent, or Firm* — Lowenstein Sandler LLP

(57) ABSTRACT

Embodiments relate to systems and methods for tracking local and remote file usage, and aggregating the resulting file usage statistics for presentation to a user. The operating system of a local computer can track and generate local file usage statistics, such as most recently used files and editing time. A Web application or service, such as an email or word processing application or service, can record the file usage data for a user's remote stored or served files. A file usage aggregator module, which can be located or resident in the operating system of the local computer or hosted at a Web site, can receive and combine the local and remote file usage statistics. The file usage aggregator module can generate a display of the aggregated file usage statistics, so that local and remote files are listed in a most-recently used order, on a combined basis.

20 Claims, 5 Drawing Sheets

(51) Int. Cl.
*G06F 16/54* (2019.01)
*G06F 16/16* (2019.01)
*G06F 16/182* (2019.01)

(58) Field of Classification Search
CPC ........ G06F 16/14; G06F 16/54; G06F 16/168;
H04L 9/088
See application file for complete search history.

(56) References Cited

U.S. PATENT DOCUMENTS

| | | | |
|---|---|---|---|
| 6,148,294 A * | 11/2000 | Beyda | G06F 16/30 |
| 6,151,609 A | 11/2000 | Truong | |
| 6,243,450 B1 * | 6/2001 | Jansen | G06Q 30/0283 |
| | | | 379/100.04 |
| 6,449,604 B1 | 9/2002 | Hansen et al. | |
| 6,823,344 B1 | 11/2004 | Isensee et al. | |
| 6,862,604 B1 * | 3/2005 | Spencer | G06F 3/0611 |
| | | | 707/802 |
| 7,124,272 B1 | 10/2006 | Kennedy et al. | |
| 7,346,613 B2 | 3/2008 | Hurst-Hiller et al. | |
| 7,533,116 B2 | 5/2009 | Lacy | |
| 2003/0083999 A1 | 5/2003 | Ramachandran et al. | |
| 2003/0220998 A1 * | 11/2003 | Jennings, III | G06F 16/958 |
| | | | 709/224 |
| 2004/0049571 A1 | 3/2004 | Johnson et al. | |
| 2004/0088276 A1 | 5/2004 | Elder et al. | |
| 2004/0255048 A1 * | 12/2004 | Lev Ran | G06F 9/546 |
| | | | 709/249 |
| 2005/0004879 A1 | 1/2005 | Mathias et al. | |
| 2005/0033777 A1 * | 2/2005 | Moraes | G06F 16/27 |
| 2005/0071741 A1 | 3/2005 | Acharya et al. | |
| 2005/0177580 A1 | 8/2005 | Hilbert et al. | |
| 2005/0188051 A1 * | 8/2005 | Sneh | G06F 9/44526 |
| | | | 709/213 |
| 2005/0192966 A1 * | 9/2005 | Hilbert | H04L 51/22 |
| 2005/0216466 A1 | 9/2005 | Miyamoto et al. | |
| 2006/0155782 A1 | 7/2006 | Berstis et al. | |
| 2006/0161511 A1 * | 7/2006 | Berstis | H04L 67/22 |
| 2006/0173818 A1 | 8/2006 | Berstis et al. | |
| 2006/0242638 A1 | 10/2006 | Lew et al. | |
| 2007/0174347 A1 | 7/2007 | Wenn et al. | |
| 2007/0198363 A1 | 8/2007 | Quoc et al. | |
| 2008/0033919 A1 | 2/2008 | Arrouye et al. | |
| 2008/0065645 A1 | 3/2008 | Eichhorn | |
| 2010/0044705 A1 | 2/2010 | Langer et al. | |

\* cited by examiner

GENERATING FILE USAGE INFORMATION

RELATED APPLICATION

This application is a continuation of U.S. patent application Ser. No. 11/948,708, filed Nov. 30, 2007, now U.S. Pat. No. 9,946,722, the entire contents of which are hereby incorporated by reference herein.

FIELD

The present invention relates to techniques for generating file usage information, and more particularly to systems and methods for aggregating local and remote file usage information for presentation to a user.

BACKGROUND OF RELATED ART

Operating systems, applications, and other software can track file usage information and present that data to a user. Many operating systems, for example, allow a user to select a view into their hard drive or other storage where individual files are sorted according to their most recently used time and date, or by other usage data. Similarly, some Web-based applications or services, such as Web-based email services or document storage services, can maintain a record of files accessed and used by a user. Web-based applications or services can likewise display or transmit a most-recently used (MRU) file list or other usage parameters to a user summarizing file usage at that site. The user can use those separate lists of information to keep track of the documents and other files that he or she is working on.

Presenting a user with separate lists of local and remote file usage can, however, be of limited usefulness to the user in practical terms. For example, a user may be working heavily on a Web word processing document, such as a letter, while they work less intensively on a spreadsheet file and a slideshow file stored on their local computer. If a list of most recently used local files is presented to a user via an operating system or utility, the user may be presented with a list at the top of which the spreadsheet and slideshow files are enumerated. The user may not be able to compare that local usage list to their remote usage data on the word processing document. If the user requests an update to their remote usage information via the Web application or service, the word processing document can be presented at the top of that list, in isolation. However no meaningful comparison can be made between the files populating the remote usage list and the local usage list, since those lists are separately generated and ordered. The user may therefore have to manually remember, compare, or search two separate lists of data to identify a most-recently or most-heavily used file, or locate a specific file. It may be desirable to provide methods and systems to aggregate both local and remote file usage to present the user with a unified view of their file access and usage history.

DESCRIPTION OF THE DRAWINGS

The accompanying drawings, which are incorporated in and constitute a part of this specification, illustrate embodiments of the invention and together with the description serve to explain the principles of the invention. In the figures.

DESCRIPTION OF EMBODIMENTS

Embodiments relate to systems and methods for creating a unified list of a user's local and remote files, sorted according to file activity. More particularly, a file usage aggregator module can be configured to retrieve usage statistics of a user at a local computer. For instance, the file usage aggregator module can retrieve the usage statistics for the user's files on a local computer under the resident operating system of the local computer. The file usage aggregator module can also retrieve usage statistics of the user at a third party Web service or application. For example, the user's remote files may be hosted at a Web application or service such as Google™ Docs, an email server, a media sharing site, or other Web service, application, or host. The history and usage statistics for the respective remote files can be maintained by the associated Web site or other network host. Given user credentials for the remote application or service, the file usage aggregator module can retrieve the remote file usage statistics from one or more remote hosts via a Web API (application programming interface) or other interface. The file usage aggregator module can then present a single view of usage characteristics of files from both local and remote sources. The file usage aggregator module can rank local and remote files based on a most-recently used (MRU) or other algorithm, in a unified list that interleaves local and remote files in order of usage. The file usage aggregator module can, in some embodiments, include a search function to perform a unified search for files by file name or content, from both the local and remote sources. The file usage aggregator module can display annotated information for each file in the unified file usage list, for example showing the file name, last time of access, or other information.

Advantages of the combined file view generated by the file usage aggregator module include the ability to assist the user in determining which local files they can move to online sites, or which remote files they may wish to backup locally. Moving files online allows the user to access those files from multiple clients. Backing up remote files to local storage can be useful if the user is planning to work with those files in a location with no network access, such as on an airplane or some hotels.

Reference will now be made in detail to exemplary embodiments of the invention, which are illustrated in the accompanying drawings. Where possible the same reference numbers will be used throughout the drawings to refer to the same or like parts.

Figure 1:
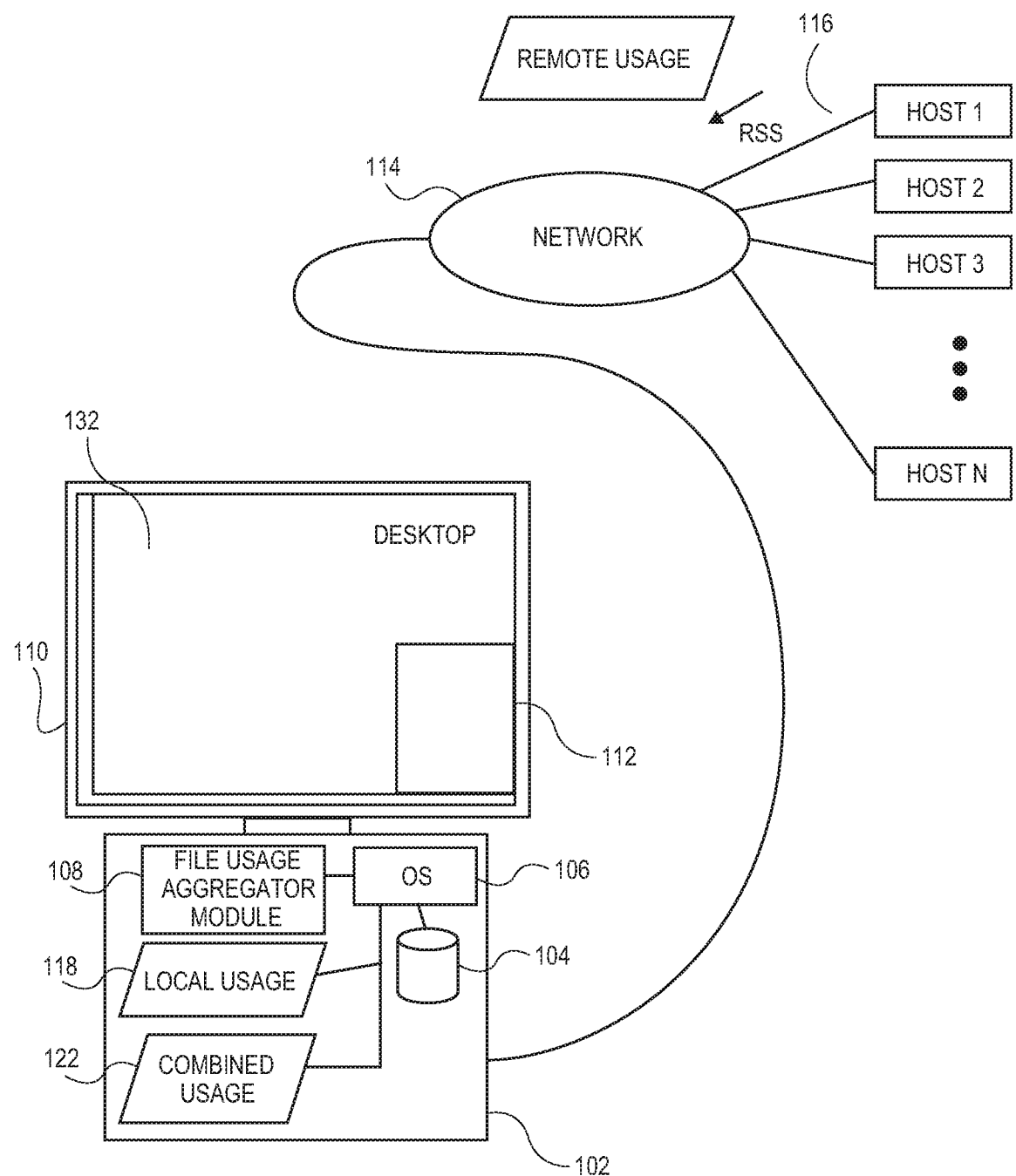
FIG. 1 illustrates an overall system for file usage processing, according to various embodiments.

FIG. 1 shows an exemplary system 100 according to embodiments of the present teachings. In embodiments as shown, a client 102 can communicate with a set of hosts 116 through a network 114. The client 102 can be a computer, network-enabled cellular telephone, personal digital assistant, or other network-enabled device. Network 114 can comprise the Internet, private networks, or other networks or connections. The set of hosts 116 can include one or more Web sites, servers, or hosts.

The set of hosts 116 can host or serve Web applications or Web services. Those Web applications or services can include, for example, email accounts and files, word processing accounts and files, search tools and files related to search activity, database accounts and files, or other applications or services. The set of hosts 116 in embodiments can comprise free or commercial application service providers (ASPs) or other portals. The applications and services provided by set of hosts 116 can be programmed or served in Java code or script, Perl code or script, Dynamic HTML (hyper text markup language), XML (extensible markup language), SOAP (service oriented architecture protocol), Ajax, or other code or platforms. The applications and services hosted by the set of hosts 116 can be accessed by client 102 via a Web API, or other programming interface. The set of hosts 116 can each locally store one or more user files in local databases or networked servers, or other storage. Exemplary host applications or services include the commercially available Google™ Docs word processing, spreadsheet, and presentation Web application, the Facebook™ personal networking site, and the Flickr™ digital photography file sharing service.

The client 102 can include local storage 104 and an operating system 106. Local storage 104 can include hard disk, optical, or electronic memory or storage. Operating system 106 can be a Linux™ distribution or other open-source operating system or platform, or a proprietary operating system. Operating system 106 can present a user interface 132 on a display 110. The user interface 132 can be a graphical user interface, for instance including a user desktop displaying applications, files, and other resources.

The client 102 can include a file usage aggregator module 108. The file usage aggregator module 108 can be integrated in operating system 106, or in embodiments can be separate from operating system 106. File usage aggregator module 108 can receive local usage data 118 indicating the history and usage of local files stored on local storage and accessed by client 102. Local usage data 118 can include data such as file name, file size information, file type information, date created information, date last accessed information, date last modified information, total file editing time information, file history information, file comment information, and file owner information. Local usage data 118 can include other data, metadata, or other information related to local files stored on local storage 104. In embodiments, file usage aggregator module 108 can interrogate operating system 106 to retrieve local usage data 118 directly or via an API. For example, in the publicly available Fedora Linux™ distribution, a file called ".recently-used.xbel" located in the user home directory can be accessed and its content can be parsed to extract information about recently used files. Other mechanisms can be used.

File usage aggregator module 108 can also communicate with the set of hosts 116 via network 114, and receive remote usage data 120 related to user files stored in or by associated host applications or services. Remote usage data 120 can include the same or similar types of information as the information stored in local usage data 118, including file name, file size information, file type information, date created information, date last accessed information, date last modified information, and the like. Remote usage data 120 can be delivered to file usage aggregator module 108 via HTTP (hyper-text transfer protocol) responses from Web services in an RSS (Really Simple Syndication) or Atom feed format, or other channels or connections. In embodiments, remote usage data 120 can be received from more than one host in the set of hosts 116, for combination together with other remote usage data along with local usage data. File usage aggregator module 108 can refresh or receive local usage data 118 and remote file usage data 120 at predetermined update periods, when notified of updates to file usage data, or at other times.

In embodiments in one regard, file usage aggregator module 108 can thereby receive both local usage data 118 and remote file usage data 120, and aggregate that information to display to the user via a file browser 112 in user interface 132. File usage aggregator module 108 can, in general, compare and combine file information contained in local usage data 118 and remote file usage data 120 to generate combined usage data 122 reflecting an overall order of file usage activity. File usage aggregator module 108 can present the resulting combined usage data 122 to the user in file browser 112, in one unified view, regardless of source and without the user needing to remember the source or path name of individual files to retrieve them.

Figure 2:
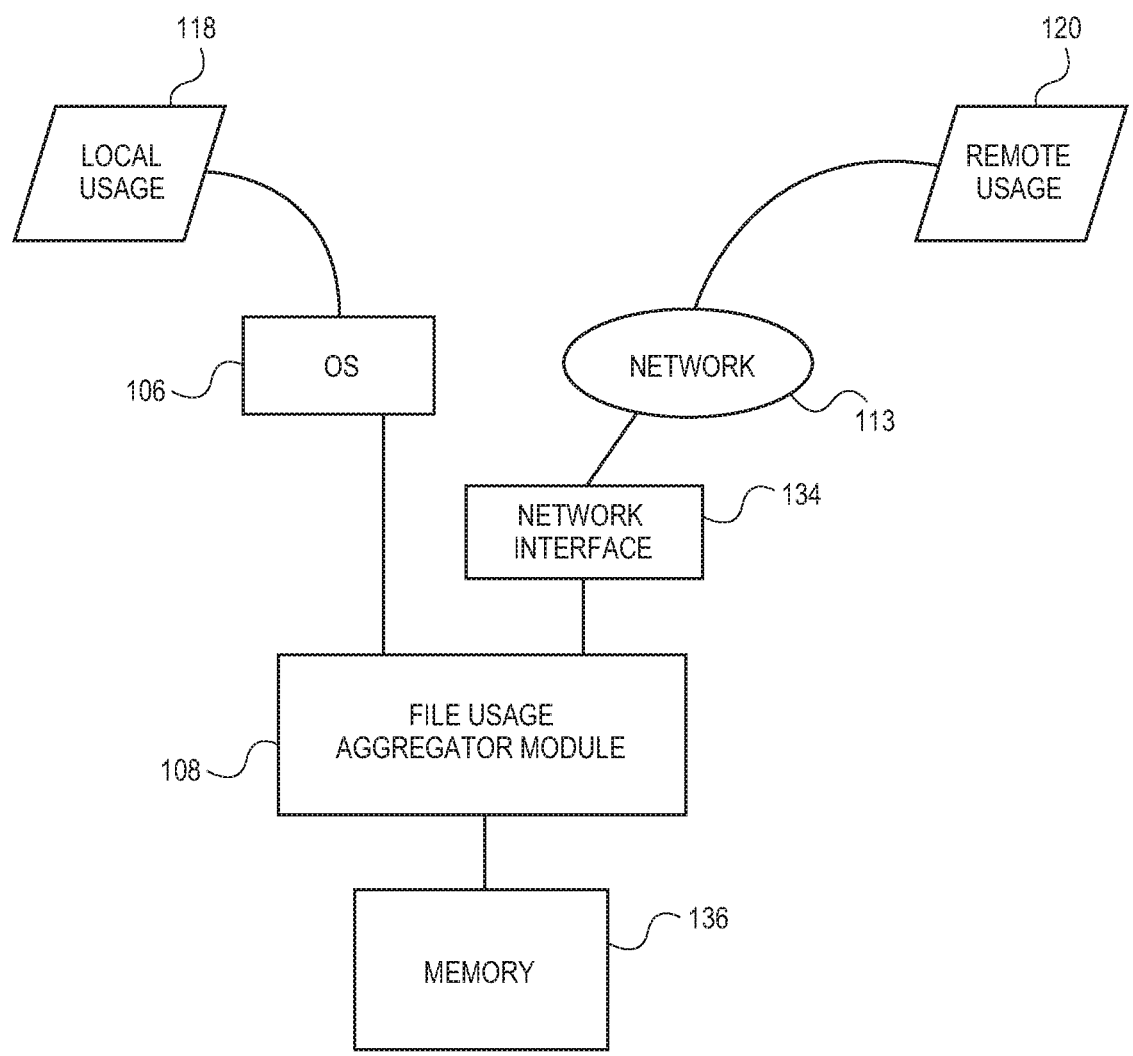
FIG. 2 illustrates a diagram of a configuration of a file usage aggregator module, according to various embodiments.

FIG. 2 illustrates a configuration of file usage aggregator module 108. File usage aggregator module 108 as shown can be connected to memory 136 of client 102. Memory 136 can comprise electronic memory such as random access memory (RAM). File usage aggregator module 108 can also be connected to a network interface 134, such as an Ethernet connection, cable modem, or other wired, wireless, or optical connection to network 114. File usage aggregator module 108 can receive remote file usage data 120 from set of hosts 116 over network 114 via network interface 134. File usage aggregator module 108 can also communicate internally with operating system 106, to receive local file usage data 118 based on files stored in local storage 104 of client 102. Other configurations of file usage aggregator module 108 are possible.

Figure 3:
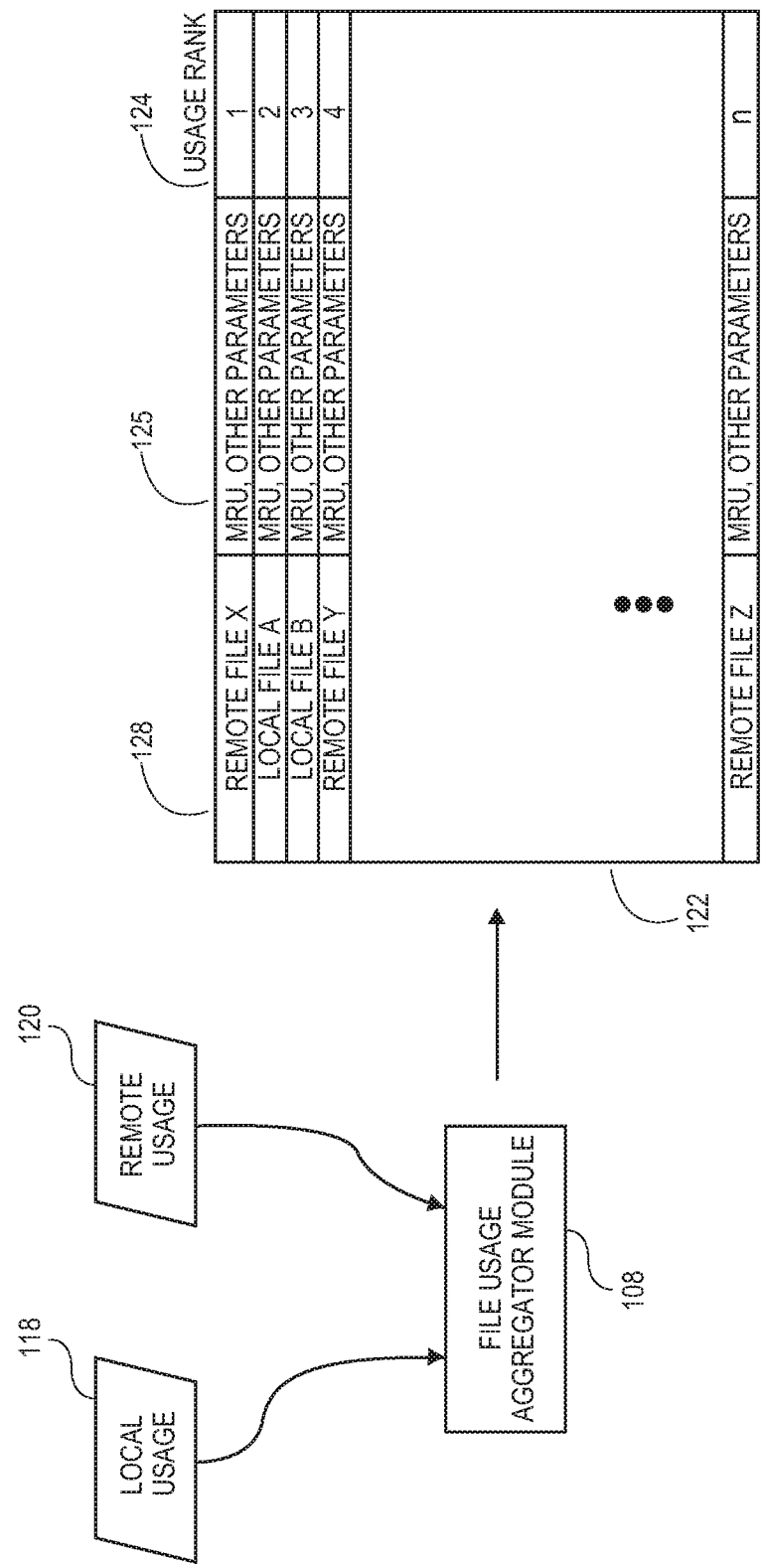
FIG. 3 illustrates aggregation of local and remote file usage information, according to various embodiments.

In terms of aggregation of file activity information, as shown in FIG. 3, file usage aggregator module 108 can receive local usage data 118 and remote file usage data 120 and compare and combine information in those file usage records to generate combined usage data 122. File usage aggregator module 108 can examine file usage parameters 126 contained in each of local usage data 118 and remote file usage data 120 to sort the set of combined files.

File usage aggregator module 108 can, for example, obtain most-recent activity information for each file in local usage data 118 and remote file usage data 120 by selecting the latest of the file's date last accessed, date last modified, and date created information. File usage aggregator module 108 can then use that information to compare and sort the files, and generate file selector list 128 based on usage rank 124 arranged in (descending) MRU order, taking both local and remote files into account. In embodiments, the combined files in file selector list 128 or other objects can be sorted based on one or more file usage parameters 126, in addition to or other than MRU data. For example, files can be sorted in usage rank 124 according to which files have received the most editing time in the last day, week, or other time period. Files can also be sorted according to the last modified date or created date alone, without combining those parameters in MRU order. Files can likewise be sorted by file name. In embodiments, file usage aggregator module 108 can store combined usage data 122 to local storage 104 of client 102, or other storage location.

Figure 4:
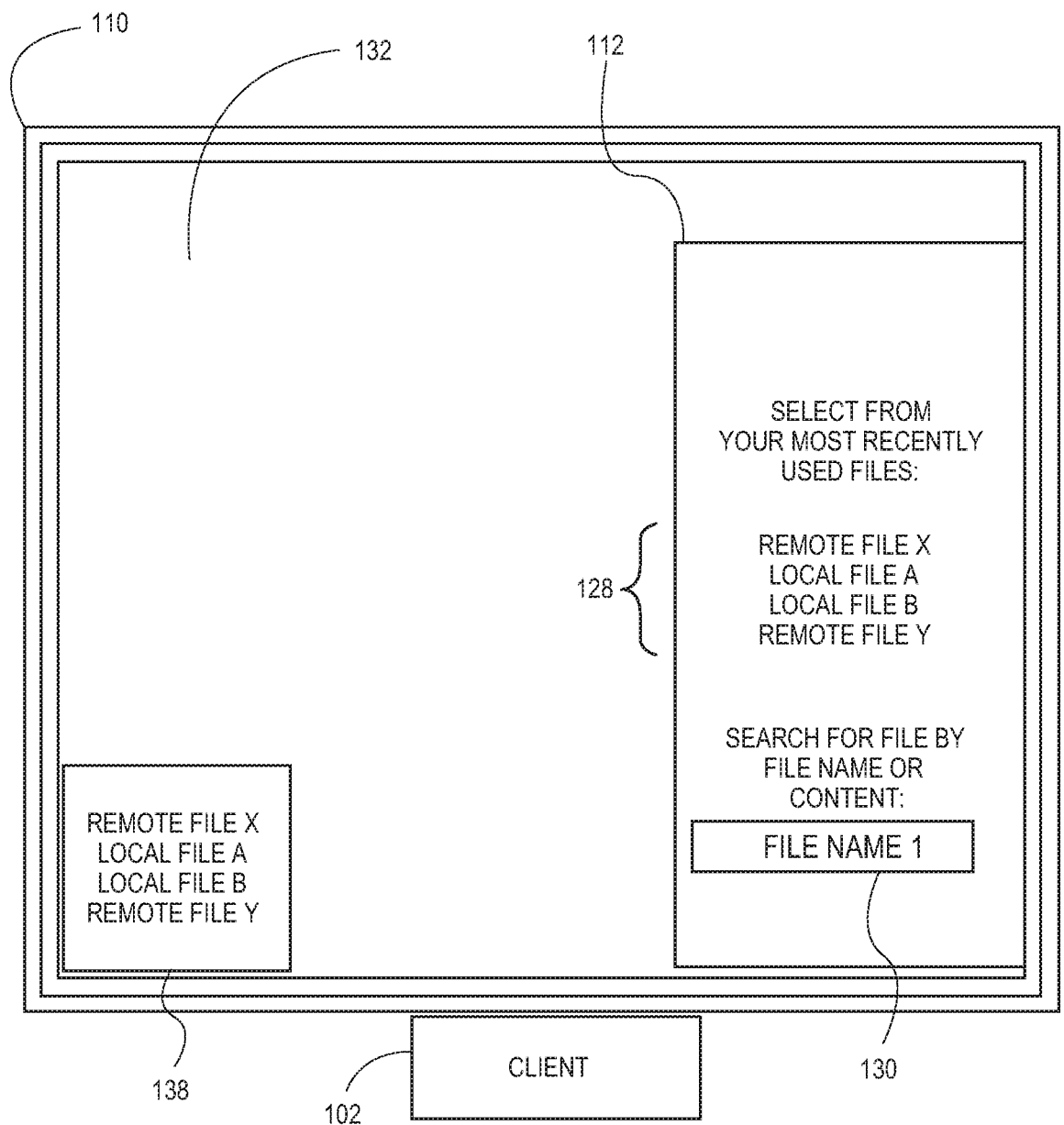
FIG. 4 illustrates a file browser displaying combined file usage information, according to various embodiments.

In embodiments as shown in FIG. 4, once file usage aggregator module 108 generates combined usage data 122, the file selector list 128 and other information can be presented to the user in file browser 112. The file browser 112 can be displayed on display 110 as a popup window, taskbar icon, or other widget or display. The user can select one or more files shown in file selector list 128 for use, for instance by moving a cursor over a desired file name and clicking a mouse. In embodiments, selecting a file from file selector list 128 can automatically open the file, using an application (e.g., email client or word processing application) associated with the file type of the selected file. The selection of any file in file selector list 128 can be transparent to the user with regard to local or remote location. The file browser 112 therefore presents the user with a unified view of their local and remote file for convenient browsing and selection, in combined order of most recent use. The file selector list 128 also therefore captures the user's actual file access patterns based on the user's complete work space, as opposed to separate views of local file usage and remote file usage.

In embodiments as also shown in FIG. 4, the file browser 112 can include a search tool 130 that presents the user with a dialog box to enter search criteria. The search tool 130 can execute searches on the combined usage data 122. The search criteria can include search strings such as file names, textual search terms to locate within files, or other search information. File usage aggregator module 108 can receive the entered search criteria and search combined usage data 122 to locate matching local or remote files, on a combined basis. Any matching files can be presented in file selector list 128, or in another list or output. The user can then select any matching files from the search results to open and use.

In embodiments, the user can configure preferences for file browser 112. For example, the maximum number of local, remote, or combined files to be retrieved or presented in file selector list 128 can be set by the user. In further embodiments, all local and remote files may be included in file selector list 128. In embodiments, the files to be displayed in file selector list 128 can also be limited by date created, date most recently used, or other user-selectable criteria.

The file browser 112 can present the user with options to perform various actions with the files presented in file selector list 128, including to copy or move files between local and remote storage. File browser 112 can also for example include options to select which application to open a file with, an ability to copy or move a file to different locations, an ability to drag a file to the desktop or another folder, an ability to rename a file, an ability to compare or merge files, an ability to mail a file as an attachment, or other actions similar to those available in conventional file browsers. File browser 112 can further allow opening a remote file in a local application, to facilitate working on the file during periods with no network access, such as an airplane trip, or in other situations when it is convenient. File browser 112 can conversely allow opening a local file in an on-line application, to facilitate identification of files stored locally that can be moved to a remote storage. Other types of file manipulation are possible.

In embodiments, in addition to being viewable in a full-function file browser 112, a selected number of sorted files from local and remote sources can be shown in a desktop sidebar 138, or other visible or readily accessible selected area or part of the user interface 132 of client 102. Providing a desktop sidebar 138 allows the user to return to working with those files simply by performing a single-click selection, once the client 102 is turned on. Some actions available in file browser 112, such as an ability to select which application to open a file with and an ability to rename the file, can be available in desktop sidebar 138, as well.

Figure 5:
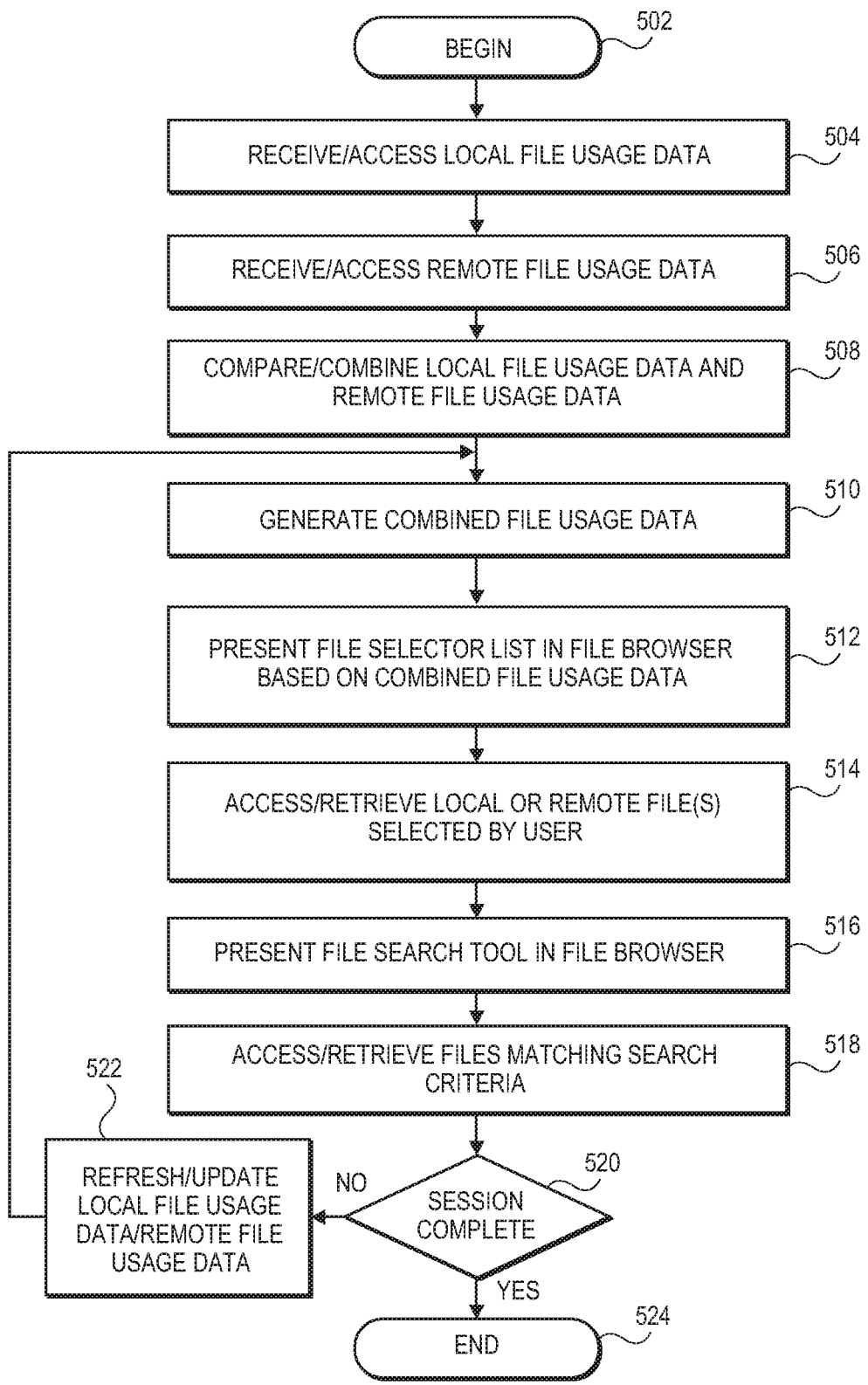
FIG. 5 illustrates overall file usage processing, according to various embodiments.

FIG. 5 illustrates overall file usage processing, according to embodiments. In step 502, processing can begin. In step 504, local file usage data 118 can be accessed or received by file usage aggregator module 108. Local file usage data 118 can be received, for example, by interrogating operating system 106 of client 102. In step 506, remote file usage data 120 can be accessed or received by file usage aggregator module 108. Remote file usage data 120 can be received, for example, from a set of hosts 116 such as Web-based or Web-hosted services or applications. The remote file usage data 120 can be received via HTTP responses from Web services in an RSS or Atom feed format, or other channel or connection.

In step 508, file usage aggregator module 108 can combine local file usage data 118 and remote file usage data 120. The local and remote usage data can be combined, for example, by merging the lists of files from the local and remote sources according to their file usage parameters 126 on a combined basis. For example, file usage aggregator module 108 can compare MRU values for all files, and the files can be compiled in an interleaved usage rank 124 that lists local and remote files in descending order starting with most recent use. Other file usage data in file usage parameters 126 as well as further file information such as name, path, or local or remote source can be used to sort or combine local file usage data 118 and remote file usage data 120.

In step 510, file usage aggregator module 108 can generate combined usage data 122 based on the results of the combination or analysis of local file usage data 118 and remote file usage data 120. In step 512, file browser 112 can present a file selector list 128 based on usage rank 124. In step 514, any files from file selector list 128 that are selected by the user can be accessed and retrieved, from local storage 104 and/or from set of hosts 116. In step 516, the file browser 112 can present a file search tool 130 to the user. File search tool 130 can include an input box or other selector or interface to permit the user to enter search strings such as file names, or to enter other search criteria. In step 518, file search tool 130 can access or retrieve files that match any entered user search criteria, likewise from local storage 104 and/or from set of hosts 116. In step 520, file usage aggregator module 108 or other logic can make a determination whether the current file usage session is complete. If the file usage session is not complete, processing can proceed to step 522 where file usage aggregator module 108 can access or receive refreshed or updated local file usage data 118 and remote file usage data 120. Processing can then return to step 510, where combined usage data 122 can be updated.

If the determination in step 520 is that file usage session is complete, processing can proceed to step 524. In step 524 processing can repeat, return to an earlier processing point, jump to a further processing point, or end.

The foregoing description is illustrative, and variations in configuration and implementation may occur to persons skilled in the art. For example, while embodiments have been described in terms of file usage aggregator module 108 residing in client 102, in embodiments file usage aggregator module 108 can reside in a remote server or site, and interrogate client 102 and set of hosts 116 to generate combined usage data 122. Likewise, in embodiments combined usage data 122 can be stored to client 102, to remote sites, or to both local and remote sites. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
   determining local file usage information of a client processing device for a first local file;
   determining remote file usage information for a Web application file stored on a remote network host; and
   compiling, by the client processing device, the local file usage information for the first local file and the remote file usage information for the Web application file to create a merged list of unified file usage information, wherein the merged list of unified file usage information comprises a first representation of the first local file associated with the local file usage information and a second representation of the Web application file associated with the remote file usage information.

2. The method of claim 1, wherein determining the remote file usage information for the Web application file stored on the remote network host comprises receiving the remote file usage information over a network.

3. The method of claim 1, wherein determining the remote file usage information comprises receiving hyper-text transfer protocol (HTTP) responses from the remote network host in a Really Simple Syndication (RSS) feed format.

4. The method of claim 1, further comprising:
   determining most-recent activity information for the first local file and for the Web application file; and
   arranging, in view of the most-recent activity information, the first local file and the Web application file in a most-recently used order in the merged list.

5. The method of claim 1, further comprising:
   generating a graphical user interface to display the merged list of unified file usage information.

6. The method of claim 5, further comprising:
   receiving a selection of at least one of the first local file or the Web application file from the merged list of unified file usage information in the graphical user interface; and
   in response to the selection, opening a corresponding one of the first local file or the Web application file.

7. The method of claim 5, further comprising:
   presenting, in the graphical user interface, a plurality of selectable options for the merged list of unified file usage information, the plurality of selectable options comprising one or more of: selecting an application with which to open one of the first local file or the Web application file, copying or moving one of the first local file or the Web application file to a different location, opening the first local file with a Web application, or opening the Web application file with a local application.

8. A client computing device comprising:
   memory; and
   a client processing device coupled to the memory, the client processing device to:
      determine local file usage information of the client processing device for a first local file;
      determine remote file usage information for a Web application file stored on a remote network host; and
      compile the local file usage information for the first local file and the remote file usage information for the Web application file to create a merged list of unified file usage information, wherein the merged list of unified file usage information comprises a first representation of the first local file associated with the local file usage information and a second representation of the Web application file associated with the remote file usage information.

9. The client computing device of claim 8, wherein to determine the remote file usage information for the Web application file stored on the remote network host, the client processing device to receive the remote file usage information over a network.

10. The client computing device of claim 8, wherein to determine the remote file usage information for the Web application file stored on the remote network host, the client processing device to receive hyper-text transfer protocol (HTTP) responses from the remote network host in a Really Simple Syndication (RSS) feed format.

11. The client computing device of claim 8, wherein the client processing device further to:
    determine most-recent activity information for the first local file and for the Web application file; and
    arrange, in view of the most-recent activity information, the first local file and the Web application file in a most-recently used order in the merged list.

12. The client computing device of claim 8, wherein the client processing device further to:
    generate a graphical user interface to display the merged list of unified file usage information.

13. The client computing device of claim 12, wherein the client processing device further to:
    receive a selection of at least one of the first local file or the Web application file from the merged list of unified file usage information in the graphical user interface; and
    in response to the selection, open a corresponding one of the first local file or the Web application file.

14. The client computing device of claim 12, wherein the client processing device further to:
    present, in the graphical user interface, a plurality of selectable options for the merged list of unified file usage information, the plurality of selectable options comprising one or more of: selecting an application with which to open one of the first local file or the Web application file, copying or moving one of the first local file or the Web application file to a different location, opening the first local file with a Web application, or opening the Web application file with a local application.

15. A non-transitory computer-readable storage medium storing instructions that, when executed by a client processing device, cause the client processing device to:
    determine local file usage information of the client processing device for a first local file;
    determine remote file usage information for a Web application file stored on a remote network host; and
    compile the local file usage information for the first local file and the remote file usage information for the Web application file to create a merged list of unified file usage information, wherein the merged list of unified file usage information comprises a first representation of the first local file associated with the local file usage information and a second representation of the Web application file associated with the remote file usage information.

16. The non-transitory computer-readable storage medium of claim 15, wherein to determine the remote file usage information for the Web application file stored on the remote network host, the client processing device to receive the remote file usage information over a network.

17. The non-transitory computer-readable storage medium of claim 15, wherein to determine the remote file usage information for the Web application file stored on the remote network host, the client processing device to receive hyper-text transfer protocol (HTTP) responses from the remote network host in a Really Simple Syndication (RSS) feed format.

18. The non-transitory computer-readable storage medium of claim 15, wherein the client processing device further to:
determine most-recent activity information for the first local file and for the Web application file; and
arrange, in view of the most-recent activity information, the first local file and the Web application file in a most-recently used order in the merged list.

19. The non-transitory computer-readable storage medium of claim 15, wherein the client processing device further to:
generate a graphical user interface to display the merged list of unified file usage information;
receive a selection of at least one of the first local file or the Web application file from the merged list of unified file usage information in the graphical user interface; and
in response to the selection, open a corresponding one of the first local file or the Web application file.

20. The non-transitory computer-readable storage medium of claim 15, wherein the client processing device further to:
generate a graphical user interface to display the merged list of unified file usage information;
present, in the graphical user interface, a plurality of selectable options for the merged list of unified file usage information, the plurality of selectable options comprising one or more of: selecting an application with which to open one of the first local file or the Web application file, copying or moving one of the first local file or the Web application file to a different location, opening the first local file with a Web application, or opening the Web application file with a local application.

* * * * *